United States Patent
Morris (10) Patent No.: US 9,061,715 B2
(45) Date of Patent: Jun. 23, 2015

(54) ELASTIC CANTILEVER BEAM ALIGNMENT SYSTEM FOR PRECISELY ALIGNING COMPONENTS

(75) Inventor: Steven E. Morris, Fair Haven, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 289 days.

(21) Appl. No.: 13/570,959

(22) Filed: Aug. 9, 2012

(65) Prior Publication Data

US 2014/0041176 A1 Feb. 13, 2014

(51) Int. Cl.
  *B25B 27/14* (2006.01)
  *B62D 25/16* (2006.01)

(52) U.S. Cl.
  CPC ......... *B62D 25/163* (2013.01); *Y10T 29/53913* (2015.01)

(58) Field of Classification Search
  CPC .............. E04F 2201/0115; E04F 2201/0146; E04F 2201/0535; A63H 33/062; B29C 65/58; B29C 66/12445; B29C 66/12469; B29C 66/1282; B29C 66/12841; H01R 13/506
  USPC .................... 29/271; 403/267, 345, 353, 375
  See application file for complete search history.

(56) References Cited

U.S. PATENT DOCUMENTS

| | | | |
|---|---|---|---|
| 1,301,302 A | 4/1919 | Nolan | |
| 1,819,126 A | 8/1931 | Scheibe | |
| 1,982,076 A | 11/1934 | Spahn | |
| 2,006,525 A | 7/1935 | Thal | |
| 2,482,488 A | 9/1949 | Franc | |
| 2,688,894 A | 9/1954 | Modrey | |
| 2,778,399 A | 1/1957 | Mroz | |
| 2,780,128 A | 2/1957 | Rapata | |
| 2,862,040 A | 11/1958 | Curran | |
| 2,902,902 A | 9/1959 | Slone | |
| 3,005,282 A | 10/1961 | Christiansen | |
| 3,014,563 A | 12/1961 | Bratton | |
| 3,087,352 A | 4/1963 | Daniel | |
| 3,130,512 A | 4/1964 | Van Buren, Jr. | |
| 3,168,961 A | 2/1965 | Yates | |
| 3,194,292 A | 7/1965 | Borowsky | |

(Continued)

FOREIGN PATENT DOCUMENTS

| CN | 1129162 A | 8/1996 |
|---|---|---|
| CN | 2888807 Y | 4/2007 |

(Continued)

OTHER PUBLICATIONS

Awtar, S. & Sevincer, E. (Sep. 2006). Elastic Averaging in Flexure Mechanisms: A Multi-Beam Parallelogram Flexure Case-Study. From the Proceedings of IDETC/CIE 2006, Paper DETC2006-99752, American Society of Mechanical Engineers (ASME).

(Continued)

*Primary Examiner* — Joseph J Hail
*Assistant Examiner* — Brian Keller
(74) *Attorney, Agent, or Firm* — Cantor Colburn LLP (57) ABSTRACT

An elastic cantilever beam alignment system for the precise mating of first and second components. A first elastic cantilever beam protrudes in parallel from the first component and is elastically over-constrained by two mutually spaced alignment walls of the second component. A second elastic cantilever beam is upstanding in perpendicular relation to the first component and is elastically deformed with respect to a cammed aperture of the second component.

8 Claims, 11 Drawing Sheets

(56) References Cited

U.S. PATENT DOCUMENTS

| | | |
|---|---|---|
| 3,213,189 A | 10/1965 | Mitchell et al. |
| 3,233,358 A | 2/1966 | Dehm |
| 3,233,503 A | 2/1966 | Birger |
| 3,244,057 A | 4/1966 | Mathison |
| 3,531,850 A | 10/1970 | Durand |
| 3,643,968 A | 2/1972 | Horvath |
| 3,842,565 A | 10/1974 | Brown et al. |
| 3,895,408 A | 7/1975 | Leingang |
| 3,905,570 A | 9/1975 | Nieuwveld |
| 4,158,511 A | 6/1979 | Herbenar |
| 4,213,675 A | 7/1980 | Pilhall |
| 4,394,853 A | 7/1983 | Lopez-Crevillen et al. |
| 4,406,033 A | 9/1983 | Chisholm et al. |
| 4,481,160 A | 11/1984 | Bree |
| 4,605,575 A | 8/1986 | Auld et al. |
| 4,767,647 A | 8/1988 | Bree |
| 4,805,272 A | 2/1989 | Yamaguchi |
| 5,139,285 A | 8/1992 | Lasinski |
| 5,234,122 A | 8/1993 | Cherng |
| 5,397,206 A | 3/1995 | Sihon |
| 5,507,610 A | 4/1996 | Benedetti et al. |
| 5,513,603 A | 5/1996 | Ang et al. |
| 5,524,786 A | 6/1996 | Skudlarek |
| 5,538,079 A | 7/1996 | Pawlick |
| 5,577,301 A | 11/1996 | Demaagd |
| 5,577,779 A | 11/1996 | Dangel |
| 5,580,204 A | 12/1996 | Hultman |
| 5,601,453 A | 2/1997 | Horchler |
| 5,634,757 A | 6/1997 | Schanz |
| 5,698,276 A | 12/1997 | Mirabitur |
| 5,736,221 A | 4/1998 | Hardigg et al. |
| 5,806,915 A | 9/1998 | Takabatake |
| 5,810,535 A | 9/1998 | Fleckenstein et al. |
| 5,941,673 A | 8/1999 | Hayakawa et al. |
| 6,193,430 B1 | 2/2001 | Culpepper et al. |
| 6,209,178 B1 | 4/2001 | Wiese et al. |
| 6,264,869 B1 | 7/2001 | Notarpietro et al. |
| 6,321,495 B1 | 11/2001 | Oami |
| 6,354,815 B1 | 3/2002 | Svihla et al. |
| 6,378,931 B1 | 4/2002 | Kolluri et al. |
| 6,398,449 B1 | 6/2002 | Loh |
| 6,484,370 B2 | 11/2002 | Kanie et al. |
| 6,485,241 B1 | 11/2002 | Oxford |
| 6,533,391 B1 | 3/2003 | Pan |
| 6,568,701 B2 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,677,065 B2 | 1/2004 | Blauer |
| 6,840,969 B2 | 1/2005 | Kobayashi et al. |
| 6,857,676 B2 | 2/2005 | Kawaguchi et al. |
| 6,932,416 B2 | 8/2005 | Clauson |
| 6,948,753 B2 | 9/2005 | Yoshida et al. |
| 6,959,954 B2 | 11/2005 | Brandt et al. |
| 6,971,831 B2 | 12/2005 | Fattori et al. |
| 7,008,003 B1 | 3/2006 | Hirose et al. |
| 7,014,094 B2 | 3/2006 | Alcoe |
| 7,036,779 B2 | 5/2006 | Kawaguchi et al. |
| 7,089,998 B2 | 8/2006 | Crook |
| 7,178,855 B2 | 2/2007 | Catron et al. |
| 7,198,315 B2 | 4/2007 | Cass et al. |
| 7,306,418 B2 | 12/2007 | Kornblum |
| 7,322,500 B2 | 1/2008 | Maierholzner |
| 7,344,056 B2 | 3/2008 | Shelmon et al. |
| 7,557,051 B2 | 7/2009 | Ryu et al. |
| D602,349 S | 10/2009 | Andersson |
| 7,764,853 B2 | 7/2010 | Yi et al. |
| 7,793,998 B2 | 9/2010 | Matsui et al. |
| 7,802,831 B2 | 9/2010 | Isayama et al. |
| 7,828,372 B2 | 11/2010 | Ellison |
| 7,862,272 B2 | 1/2011 | Nakajima |
| 7,883,137 B2 | 2/2011 | Bar |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,261,581 B2 | 9/2012 | Cerruti et al. |
| 8,297,137 B2 | 10/2012 | Dole |
| 8,444,199 B2 | 5/2013 | Takeuchi et al. |
| 8,695,201 B2 | 4/2014 | Morris |
| 2002/0045086 A1 | 4/2002 | Tsuji et al. |
| 2002/0092598 A1 | 7/2002 | Jones et al. |
| 2002/0136617 A1 | 9/2002 | Imahigashi |
| 2003/0082986 A1 | 5/2003 | Wiens et al. |
| 2003/0087047 A1 | 5/2003 | Blauer |
| 2003/0108401 A1 | 6/2003 | Agha et al. |
| 2003/0180122 A1 | 9/2003 | Dobson |
| 2004/0131896 A1 | 7/2004 | Blauer |
| 2004/0139678 A1* | 7/2004 | Pervan ........................ 52/578 |
| 2004/0208728 A1 | 10/2004 | Fattori et al. |
| 2005/0031946 A1 | 2/2005 | Kruger et al. |
| 2005/0244250 A1 | 11/2005 | Okada et al. |
| 2006/0102214 A1 | 5/2006 | Clemons |
| 2006/0141318 A1 | 6/2006 | MacKinnon et al. |
| 2006/0197356 A1 | 9/2006 | Catron et al. |
| 2007/0144659 A1 | 6/2007 | De La Fuente |
| 2007/0292205 A1 | 12/2007 | Duval |
| 2008/0094447 A1 | 4/2008 | Drury et al. |
| 2008/0217796 A1 | 9/2008 | Van Bruggen et al. |
| 2008/0260488 A1 | 10/2008 | Scroggie et al. |
| 2009/0134652 A1 | 5/2009 | Araki |
| 2009/0174207 A1 | 7/2009 | Lota |
| 2010/0021267 A1 | 1/2010 | Nitsche |
| 2010/0102538 A1 | 4/2010 | Paxton et al. |
| 2010/0270745 A1 | 10/2010 | Hurlbert et al. |
| 2011/0076588 A1 | 3/2011 | Yamaura |
| 2011/0207024 A1 | 8/2011 | Bogumil et al. |
| 2011/0296764 A1 | 12/2011 | Sawatani et al. |
| 2012/0115010 A1* | 5/2012 | Smith et al. ................ 429/151 |
| 2013/0019454 A1* | 1/2013 | Colombo et al. ........... 29/464 |
| 2013/0019455 A1* | 1/2013 | Morris ......................... 29/466 |
| 2013/0157015 A1* | 6/2013 | Morris ......................... 428/167 |
| 2013/0287992 A1* | 10/2013 | Morris ......................... 428/99 |
| 2014/0033493 A1* | 2/2014 | Morris et al. ............... 29/407.09 |
| 2014/0041185 A1 | 2/2014 | Morris et al. |
| 2014/0041199 A1 | 2/2014 | Morris |
| 2014/0042704 A1 | 2/2014 | Polewarczyk |
| 2014/0047691 A1 | 2/2014 | Colombo et al. |
| 2014/0047697 A1 | 2/2014 | Morris |
| 2014/0080036 A1 | 3/2014 | Smith et al. |

FOREIGN PATENT DOCUMENTS

| | | |
|---|---|---|
| CN | 2915389 Y | 6/2007 |
| CN | 101250964 A | 4/2008 |
| CN | 201268336 Y | 7/2009 |
| CN | 201703439 U | 1/2011 |
| CN | 201737062 U | 2/2011 |
| CN | 201792722 U | 4/2011 |
| CN | 202079532 U | 12/2011 |
| DE | 3704190 A1 | 12/1987 |
| DE | 3711696 A1 | 10/1988 |
| DE | 3805693 A1 | 2/1989 |
| DE | 69600357 T2 | 12/1998 |
| DE | 10234253 B3 | 4/2004 |
| DE | 102008005618 A1 | 7/2009 |
| DE | 102010028323 A1 | 11/2011 |
| DE | 102011050003 A1 | 10/2012 |
| EP | 0118796 | 9/1984 |
| EP | 1132263 A1 | 9/2001 |
| EP | 1273766 A1 | 1/2003 |
| EP | 1293384 A2 | 3/2003 |
| EP | 2450259 A1 | 5/2012 |
| JP | 2001171554 A | 6/2001 |
| JP | 2005268004 | 9/2005 |
| JP | 2006205918 | 8/2006 |
| JP | 2009084844 | 4/2009 |
| WO | 2008140659 A1 | 11/2008 |

OTHER PUBLICATIONS

Balasubramaniam, M., Golaski, E., Son, S., Sriram, K. & Slocum, A. (Jul. 2002). An Anti Backlash Two-Part Shaft Coupling with Inter- (56) References Cited

OTHER PUBLICATIONS locking Elastically Averaged Teeth. Precision Engineering, vol. 26, No. 3, Elsevier Publishing.

DeVita, L., Plante, J. & Dubowsky, S. (Jun. 2007). The Design of High Precision Parallel Mechanisms using Binary Actuation and Elastic Averaging: With Application to MRI Cancer Treatment., 12th IFToMM World Congress, Besancon (France).

Gurung, S. (Dec. 2007). Passive Alignment of Micro-Fluidic Chips Using the Principle of Elastic Averaging. Thesis: Louisiana State University, Dept. of Mechanical Engineering.

Willoughby, P. & Slocum, A. (2004). Precision Connector Assembly using Elastic Averaging. Massachusetts Institute of Technology (MIT), Cambridge, MA, American Society for Precision Engineering.

Cross-sectional view of a prior art infrared welded assembly of BMW, Munich, Germany. Believed on the market since about Jan. 1, 2010.

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

* cited by examiner

ELASTIC CANTILEVER BEAM ALIGNMENT SYSTEM FOR PRECISELY ALIGNING COMPONENTS

TECHNICAL FIELD

The present invention relates to elastically averaged male and female alignment features which mutually cooperate to precisely align and pull together a pair of components during a mating operation.

BACKGROUND OF THE INVENTION

Currently, components which are to be mated together in a manufacturing process are mutually located with respect to each other by 2-way and/or 4-way male location features, typically upstanding bosses, which are received into corresponding female location features, typically apertures in the form of holes or slots. There is a clearance between the male location features and their respective female location features which is predetermined to match anticipated size and positional variation tolerances of the male and female location features as a result of manufacturing (or fabrication) variances. As a result, there can occur significant positional variation as between the mated first and second components which contributes to the presence of undesirably large and varying gaps and otherwise poor fit therebetween.

By way of example, FIGS. 1 through 12 illustrate a prior art location modality for providing approximate aligning of two components as they are being mutually mated.

Figure 1:
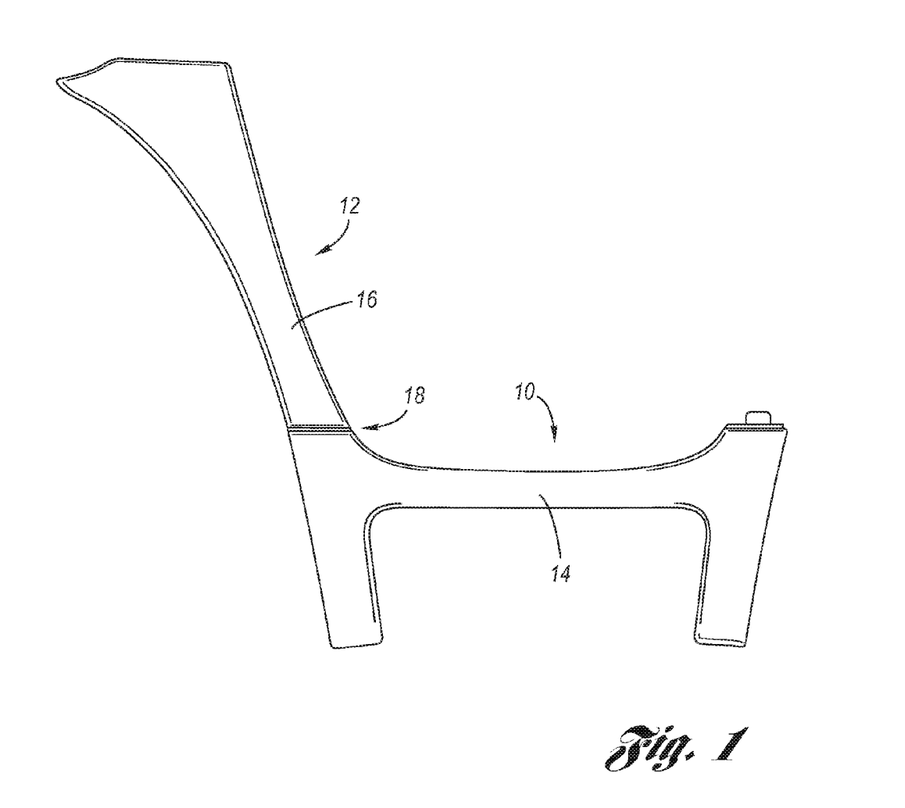
FIG. 1 is a plan view of a first component generally aligned to a second component utilizing a prior art location modality, wherein the Class A finish sides are shown.
Figure 2:
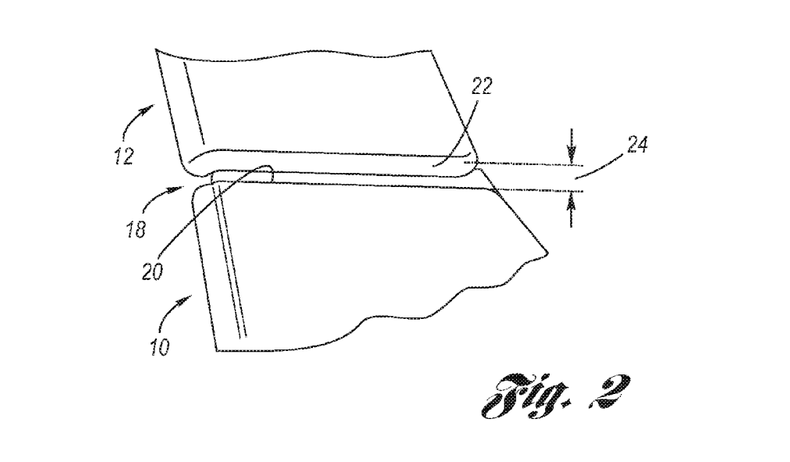
FIG. 2 is a perspective, detail view of the joinder between the first and second components shown at FIG. 1.

As shown at FIG. 1, a first component 10 is mated to a second component 12, wherein the Class A finish side 14, 16 of the first and second components is depicted. In that the first and second components 10, 12 may have a significant alignment float, depending upon manufacturing variances, the joinder 18, seen best at FIG. 2, is characterized by each respective edge 20, 22 having a large radius (for example on the order of 1.5 mm radius) in order to make appear less notable the fact that the edges are separated from one another by a gap 24 (for example on the order of 1 to 4 mm).

Figure 3:
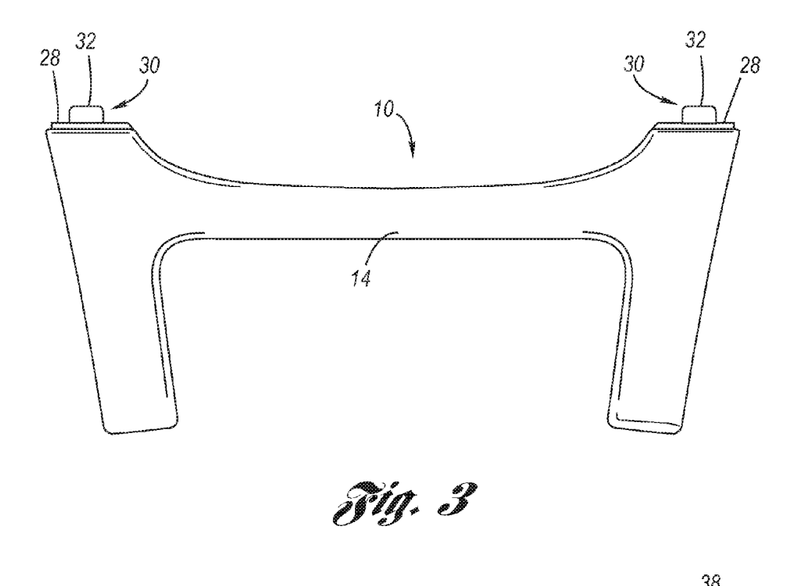
FIG. 3 is a plan view of the Class A finish side of the first component of FIG. 1.
Figure 4:
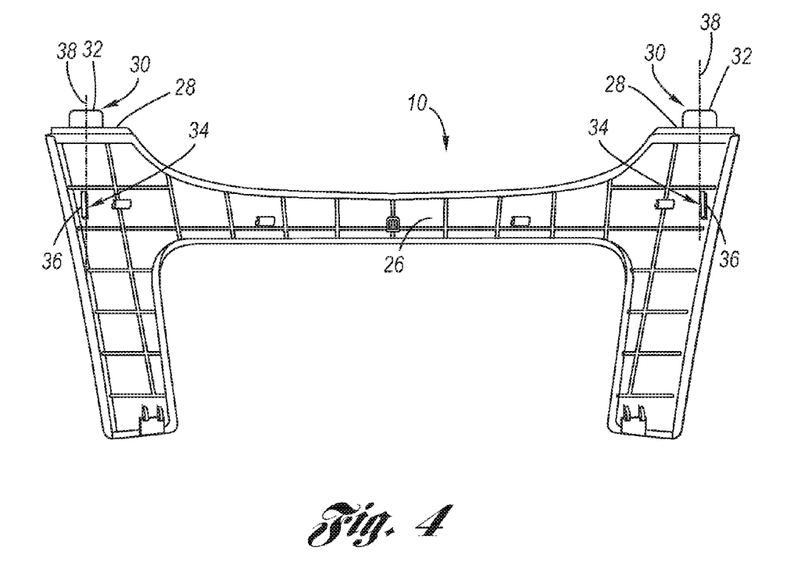
FIG. 4 is a plan view of the Class B finish side of the first component of FIG. 1.

As shown at FIGS. 3 and 4, the first component 10 has the aforementioned Class A finish side 14 (which is intended to be visible) and an opposite Class B finish side 26 (which is not intended to be visible). At least one pair of first and second male location features 30, 34 are carried by the first component 10, by way of exemplification two pairs being shown. The first male location feature 30 is in the form of a forwardly protruding tab 32, which protrudes in relation to a leading edge 28, and is oriented parallel to the Class B finish side 26 with an offset spacing 35 (see FIG. 10) in relation to the Class A finish side 14. The second male location feature 34 is in the form of an upstanding tab 36 oriented in perpendicular relation to the Class B finish side 26 which is elongated along a protrusion axis 38 of the forwardly protruding tab 32. The forwardly protruding tab and the upstanding tab are mutually separated from each other along the protrusion axis 38.

Figures 5, 6, 7:
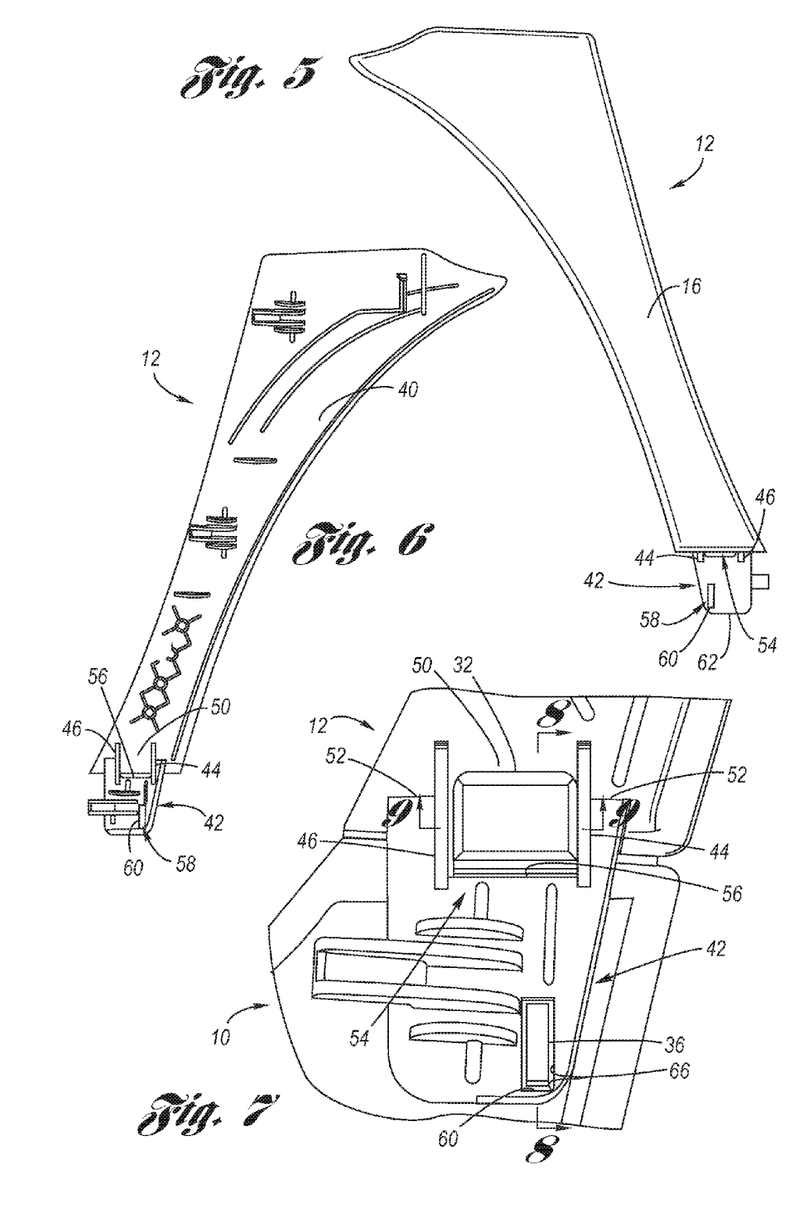
FIG. 5 is a plan view of the Class A finish side of the second component of FIG. 1.
FIG. 6 is a plan view of the Class B finish side of the second component of FIG. 1.
FIG. 7 is a perspective, detail view showing the first and second male location features interfaced with respective first and second female location features of the prior art, wherein the first component is mated to the second component as in FIG. 1, where now the Class B sides are depicted.

As shown at FIGS. 5 and 6, the second component 12 has the aforementioned Class A finish side 16 (which is intended to be visible) and an opposite Class B finish side 40 (which is not intended to be visible). A planar foot 42 projects from the Class B finish side 40 in parallel and offset spaced relation thereto. In this regard, first and second support walls 44, 46 provide the offset spacing 48 (see FIG. 10) between the planar foot 42 and a floor 50 of the Class B finish side 40, the floor being disposed between the first and second support walls, wherein additional support is provided by a pair of flanges (see 52 in FIG. 7). A pair of first and second female location features 54, 58 are carried by the second component 12. The first female location feature 54 is formed by the combination of a rearward cutout 56 of the foot 42 between the first and second support walls 44, 46 and the offset spacing 48. The second female location feature 58 is disposed in the foot 42 in the form of an elongated aperture 60, elongated in generally perpendicular relation to an end edge 62 of the foot.

Figures 8, 9, 10, 11:
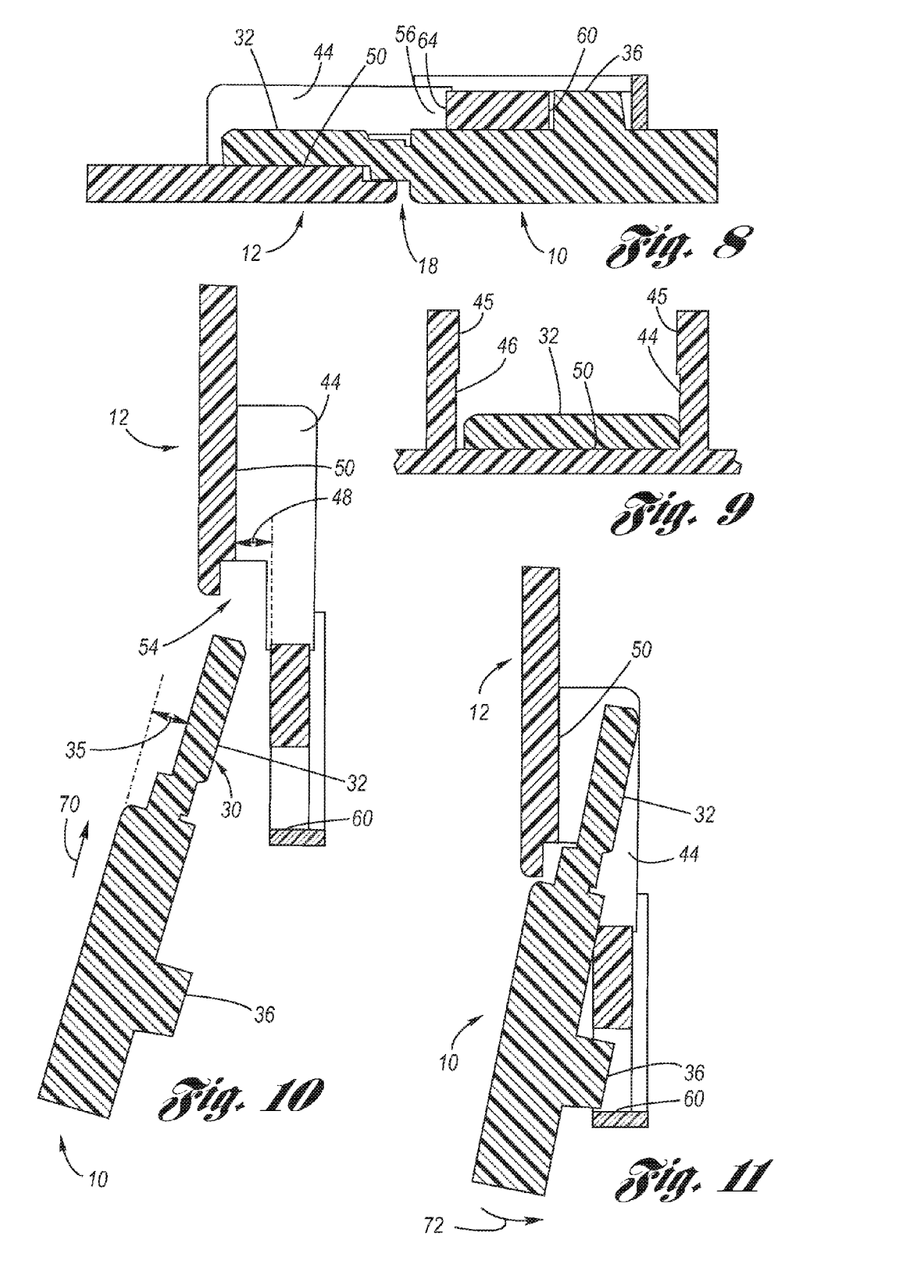
FIG. 8 is a sectional view, seen along line 8-8 of FIG. 7.
FIG. 9 is a sectional view seen along line 9-9 of FIG. 7.
FIG. 10 is a sectional view as in FIG. 8, showing mating of the first and second components of FIG. 1 at an initial stage of the mating process.
FIG. 11 is a sectional view as in FIG. 8, showing mating of the first and second components of FIG. 1 at a latter stage of the mating process.

As shown at FIGS. 7 through 9, the aforedescribed pairs of first and second male and female location features mutually interface to approximately locate the first component 10 relative to the second component 12, wherein the first male location feature 30 is loosely seated in the first female location feature 54 and the second male location feature 34 is loosely seated in the second female location feature 58.

With regard to the first male and female location features 30, 54, the forwardly protruding tab 32 is disposed between the first and second support walls 44, 46, adjacent the rearward cutout 56 and resting flatly upon the floor 50. The manufacturing process of the first and second components 10, 12 is predetermined to render a high precision abutting location of the forwardly protruding tab in relation to the first support wall 44; otherwise, to allow for manufacturing variances, the forwardly protruding tab 32 is spaced from the second support wall 46, as well as the blind end 64 of the rearward cutout 56.

With regard to the second male and female location features 34, 58, the upstanding tab 36 is seated in the elongated aperture 60, wherein the elongated aperture is cross-sectionally larger than that of the upstanding tab in order to allow for manufacturing variances, whereby on all four sides of the upstanding tab are spaced from the correspondingly facing aperture sidewalls 66.

The mating process of the first and second components 10, 12 is exemplified at FIGS. 10 and 11, wherein FIG. 8 depicts the fully mated state of the first and second components. The second component is considered by way of example to be already affixed to a structure (not shown). At FIG. 10, the first component 10 is acutely angled with respect to the second component 12, then the first male location feature 30 (the forwardly protruding tab 32) is inserted (see arrow 70) into the first female location feature 54. A boss 45 on each of the first and second support walls prevents over insertion. Thereafter, the first component 10 is rotated (see arrow 72 in FIG. 11) relative to the second component 12 so that the second male location feature 34 (the upstanding tab 36) is received by the second female location feature 58 (the elongated aperture 60) as the forwardly protruding tab 32 moves toward abutment with the floor 50.

Figures 12, 13, 14:
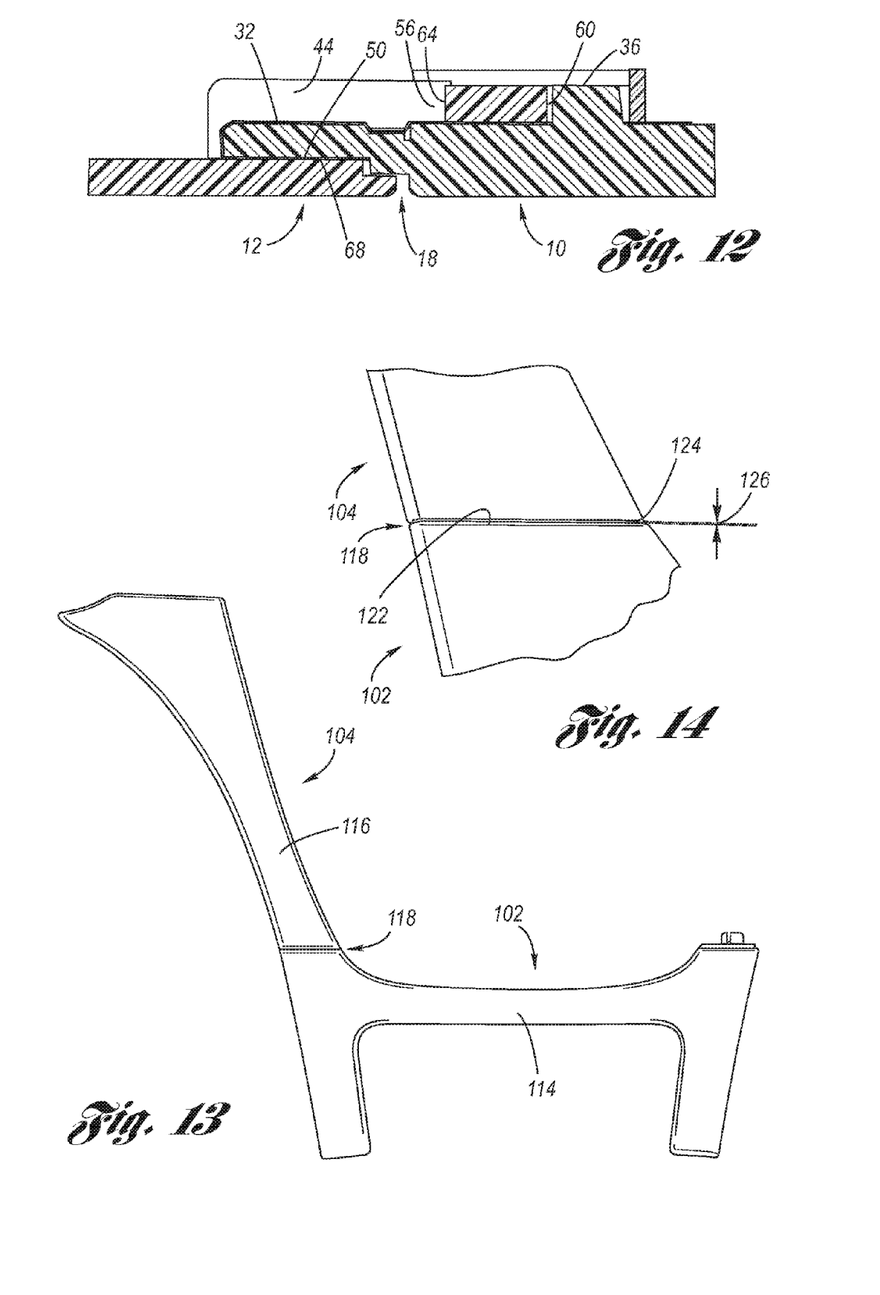
FIG. 12 is a sectional view as in FIG. 8, now showing a prior art anti-rattle material disposed between the first and second components.
FIG. 13 is a plan view of a first component generally aligned to a second component utilizing the elastic cantilever beam alignment system in accordance with the present invention, wherein the Class A finish sides are shown.
FIG. 14 is a perspective, detail view of the joinder between the first and second components shown at FIG. 13.

As the first and second components 10, 12 are mated together, the forwardly protruding tab 32 passes into the space between the first and second support walls 44, 46, and once the upstanding tab 36 enters the elongated aperture 60, a general, but not precise alignment of the first and second components takes place. Problematically, however, there is considerable float as between the first and second components when in the fully mated state (see FIGS. 8 and 9) as between the first male and female location features and the second male and female location features. Because of this float (or play) the first component is aligned relative to the second component generally, but not precisely. When the first component is secured to an attachment structure (not shown), any misfit of alignment becomes manifest, and the visible joinder, a "V-shaped" gap 26 (see FIG. 2) between the first and second components may be irregular, have too large a gap, be unbalanced in appearance, etc., in any event an untoward misfit of alignment renders the fit unacceptable for a Class A finish. In addition, these clearances can inadvertently allow the mated components to move relative to each other, resulting in rattle; necessitating the introduction of a silencing material 68 therebetween, for example as shown at FIG. 12. In any event, the interface of the first and second male location features with the first and second female features is structurally unable to pull the first and second components together at the joinder.

Accordingly, what remains needed in the art is to somehow provide an alignment modality for the mating of first and second components, wherein when mating is completed there is a lack of play as between the male and female location features so as to provide a precision alignment and the first and second components are pulled together at their joinder.

SUMMARY OF THE INVENTION

The present invention is an elastic cantilever beam alignment system for the precise mating of first and second components, particularly motor vehicle components, wherein when mating of the first and second components is completed, there is a lack of float (or play) therebetween such that a precision alignment with stiffened positional constraint is provided, and the first and second components are pulled together at their joinder. In this regard, the elastic cantilever beam alignment system utilizes first and second male alignment features connected to the first component which respectively interface with first and second female alignment features connected to the second component.

The first male alignment feature is configured in the form of a first elastic cantilever beam disposed in a forwardly protruding relation to the first component, being generally parallel in relation to a first side of the first component and disposed in offset relation to the opposite, second side of the first component. The first elastic cantilever beam has a generally non-deformable beam arm on one side of a slot, and an elastically deformable beam arm on the other side of the slot. The second male elastic alignment feature is configured in the form of a second elastic cantilever beam which is oriented in upstanding, perpendicular relation to the first side of the first component and elongated perpendicular to a protrusion axis of the first elastic cantilever beam, wherein the first elastic cantilever beam and the second elastic cantilever beam are separated from each other along the protrusion axis.

The second component has connected therewith first and second alignment walls in upstanding, perpendicular relation to a generally planar floor extending therebetween, wherein the floor is disposed on a first side of the second component. The first alignment wall has a predetermined precise vertical location on the second component, and the second alignment wall has a first wedge cam which is configured so as to progressively approach the first alignment wall with decreasing distance from the floor. Connected to the first and second alignment walls is a generally planar foot which has a vertically offset spacing from the floor and is oriented in parallel relation thereto. The foot preferably has a rearward cutout adjoining the first and second alignment walls. The first female alignment feature is formed by the combination of the first and second alignment walls and the floor therebetween as well as the vertically offset spacing between the floor and the foot; and, if present, it may also include the rearward cutout. The second female alignment feature is disposed in the foot in the form of a cammed aperture which has a second wedge cam formed on a cam sidewall disposed furthest from the first female alignment feature.

In an example of the mating process of the first and second components, the first component is acutely angled with respect to the second component, then the first male alignment feature is inserted into the first female alignment feature. Thereafter, the first component is rotated relative to the second component so that the second male alignment feature is received by the second female alignment feature. As the first and second components are mated together during the rotation, the first elastic cantilever beam contacts the first and second alignment walls and becomes over-constrained in relation thereto by action of the first wedge cam in relation to the first alignment wall. This over-constrained relationship is characterized by the elastically deformable beam arm being elastically deformed into the slot, wherein the process concludes when the first elastic cantilever beam abuts the floor. Simultaneously, the second elastic cantilever beam is received into the cammed aperture, and in so doing is resiliently bent by abutting relation to the second wedge cam of the cammed aperture. A beam boss may be disposed at the distal end of the second elastic cantilever beam, wherein once it has passed through the cammed aperture, the second elastic cantilever beam snaps resiliently into a less bent, yet still over-constrained state, whereupon the beam boss is now interferingly resting upon the foot adjoining the cam sidewall. The first and second components are now in the fully mated state.

It is to be understood from the foregoing description that as the first component is rotated relative to the second component, the first wedge cam resiliently bends the elastically deformable beam arm, which over-constrained relationship of the first elastic cantilever beam with respect to the first and second alignment walls eliminates cross-car movement of the first and second components so as to precisely align them to each other. Simultaneously, the second wedge cam at the cam sidewall of the cammed aperture acts on the second elastic cantilever beam to cause it to be elastically deformed, which over-constrained relationship therebetween pulls the first and second components together and thereby eliminates up-down spacing therebetween at their joinder, facilitated by the beam boss, if present. Additionally the over-constrained relationships at the fully mated state of the first and second components eliminate rattle and provide stiffened positional constraint between the first and second components. The over-constrained relationships eliminate the variation attributable to the clearances generally needed to assemble mating components in the prior art (i.e., as discussed with respect to FIGS. 1 through 12), eliminates rattle, provides rigidity, and serves to pull the mating components toward each other resulting in precisely aligned mating surfaces.

In accordance with the present invention, elastic averaged deformation by the first elastic cantilever beam and the second elastic cantilever beam provide an elastic averaged fit between the first and second components, being averaged over manufacturing variance of the male and female alignment features.

Accordingly, it is an object of the present invention to provide an elastic cantilever beam alignment system for the precise mating of first and second components, particularly motor vehicle components, wherein when mating of the first and second components is completed, there is a lack of float (or play) therebetween such that a precision alignment with stiffened positional constraint is provided alignment, and the first and second components are pulled together at their joinder.

This and additional objects, features and advantages of the present invention will become clearer from the following specification of a preferred embodiment.

DESCRIPTION OF THE PREFERRED EMBODIMENT

Referring now to the Drawing, FIGS. 13 through 26 depict various examples of the structure and function of the elastic cantilever beam alignment system 100 according to the present invention for the precise mating of first and second components 102, 104, particularly motor vehicle components, wherein when mating of the first and second components has attained the fully mated state, there is a lack of float (or play) therebetween, and the first and second components have pulled together at the joinder thereof. The lack of float and the pulling together are provided by over-constrained interfacing of first and second male alignment features 106, 108 of the first component with respect to corresponding first and second female alignment features 110, 112 of the second component, wherein a stiffened positional constraint is also thereby provided.

As depicted at FIG. 13, the first component 102 is mated to the second component 104, wherein the Class A finish side 114, 116 of the first and second components is depicted. In that the first and second components 102, 104 are precisely aligned and pulled together by the elastic cantilever beam alignment system 100 (see FIG. 19), the joinder 118, seen best at FIG. 14, is characterized by each respective edge 122, 124 having an extremely small to non-existent gap 126 therebetween (as for example between 0.0 and 0.05 mm), whereby each edge may have a small radius (for example on the order of 0.5 mm radius) and the appearance is repeatedly and reliably always Class A.

Figure 15:
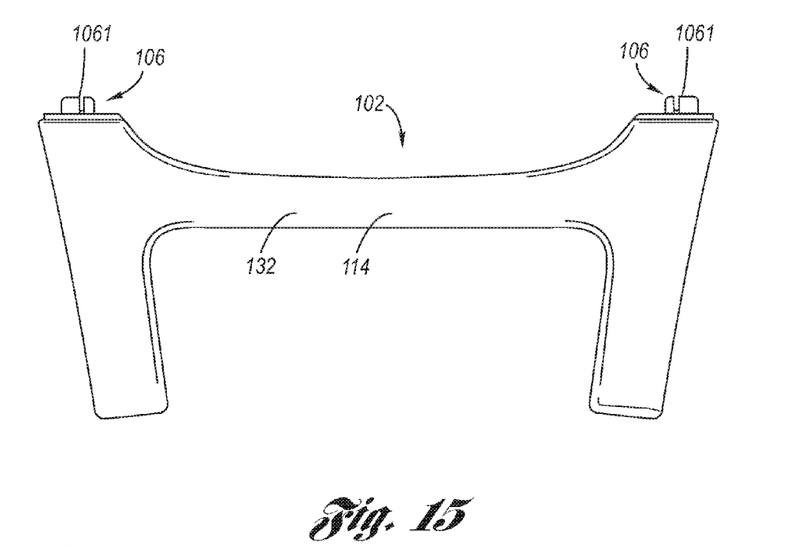
FIG. 15 is a plan view of the Class A finish side of the first component of FIG. 13.
Figure 16:
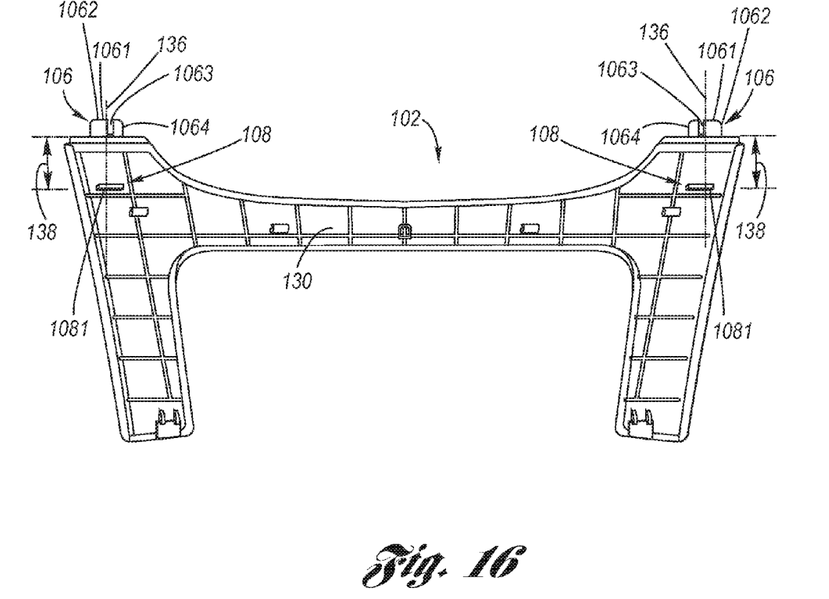
FIG. 16 is a plan view of the Class B finish side of the first component of FIG. 13.

Turning attention now to FIGS. 15 and 16, the first male alignment feature 106 (two being shown by way of example) is configured in the form of a first elastic cantilever beam 1061 disposed in a forwardly protruding relation to a forward edge 128 the first component 102. The first elastic cantilever beam 1061 is disposed generally parallel in relation to a first side 130 (a Class B finish side) of the first component 102 in offset relation to the opposite, second side 132 (the aforementioned Class A finish side 114) of the first component via a beam offset 134 (see FIG. 22). The first elastic cantilever beam 1061 has a generally non-deformable beam arm 1062 on one side of a slot 1063, and an elastically deformable beam arm 1064 on the other side of the slot.

The second male alignment feature 108 is configured in the form of a second elastic cantilever beam 1081 which is oriented in upstanding, perpendicular relation to the first side 130 of the first component 102. The second elastic cantilever beam 1081 is elongated perpendicular to a protrusion axis 136 of the first elastic cantilever beam 1061, wherein the first elastic cantilever beam and the second elastic cantilever beam are separated from each other by a beam separation 138 along the protrusion axis. At the distal end of the second elastic cantilever beam 1081 is optionally, although preferably, disposed a convex shaped beam boss 1082 (see FIG. 20) facing in a direction that is diametrically away from the first elastic cantilever beam 1061. At the base of the second elastic cantilever beam, disposed opposite in relation to the beam boss 1082, is a rib 1083.

Figures 17, 18:
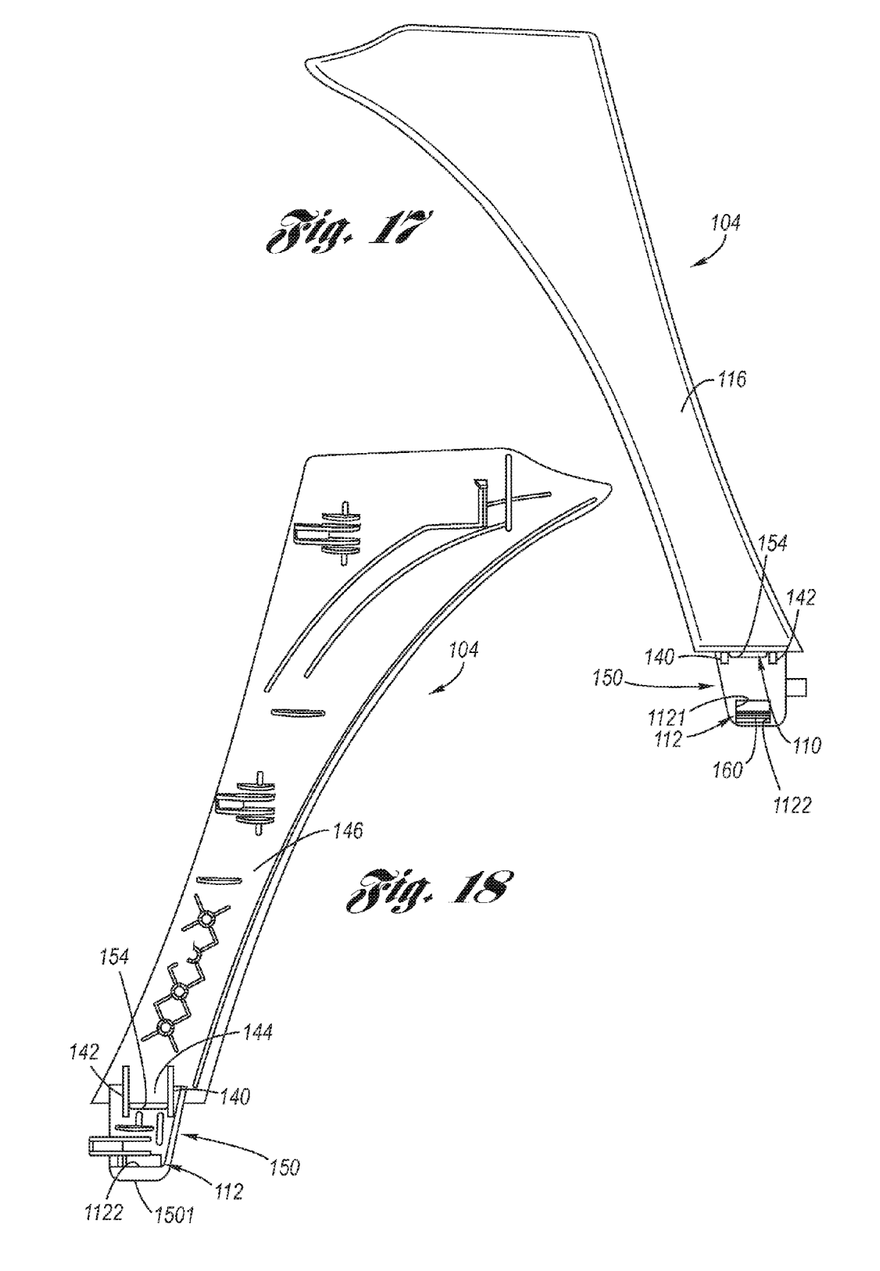
FIG. 17 is a plan view of the Class A finish side of the second component of FIG. 13.
FIG. 18 is a plan view of the Class B finish side of the second component of FIG. 13.

Next, turning attention to FIGS. 17 and 18, the second component 104 has connected therewith first and second alignment walls 140, 142 in upstanding, perpendicular relation to a generally planar floor 144 extending therebetween, wherein the floor is disposed on a first side 146 (a Class B finish side) of the second component (the second, aforementioned Class A, side 116 being disposed opposite thereto). The first alignment wall 140 has a predetermined precise vertical location on the second component 104, which is defined by the tooling and processing of the manufacture of the second component. The second alignment wall 142 has a first wedge cam 148 (shown best at FIGS. 21 and 26) facing toward the first alignment wall 140, wherein the first wedge cam has an obtuse angle 182 with respect to the floor 144 (see FIG. 22) such that first wedge cam increasingly approaches the first alignment wall with decreasing distance from the floor. Connected to the first and second alignment walls 140, 142 is a generally planar foot 150 which is vertically offset (see FIG. 22) by a foot offset spacing 152 from the floor 144 and is oriented in parallel relation thereto. The foot 150 is additionally supported by a pair of flanges 155, and preferably has a rearward cutout 154 adjoining the first and second alignment walls 140, 142. The first female alignment feature 110 is formed by the combination of: a) the first and second alignment walls 140, 142 and the floor 144 disposed therebetween, and b) and the foot offset spacing 152 between the floor and the foot; and, if present may further include, c) the rearward cutout.

The second female alignment feature 112 is disposed in the foot 150 and is in the form of a cammed aperture 1121, depicted being elongated in generally parallel relation to an end edge 1501 of the foot 150. The cammed aperture 1121 has a second wedge cam 160 formed in a cam sidewall 1122 most distally disposed in relation to the first female alignment feature 110. The second wedge cam 160 is acutely angled (as for example around 60 degrees) relative to the plane of the foot (see angle 180 at FIG. 22) which provides an entry opening 182 (for entry of the second male cantilever feature 108) which is larger than an exit opening 184 (see FIG. 22).

Figure 19:
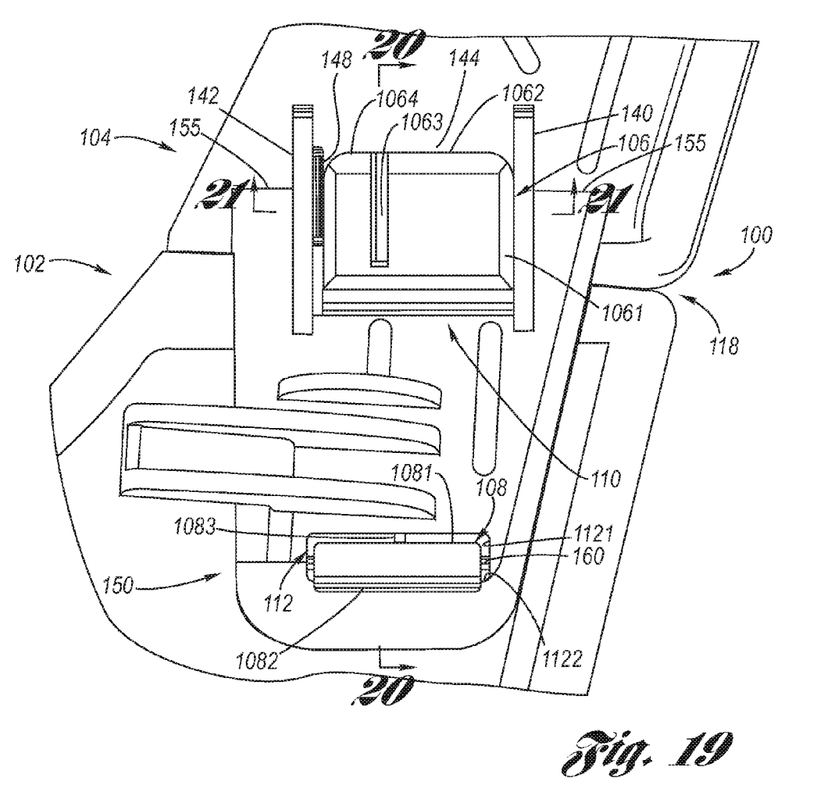
FIG. 19 is a perspective, detail view showing the first and second male elastic alignment features interfaced with respective first and second female alignment features of the present invention, wherein the first component is mated to the second component as in FIG. 13, where now the Class B sides are depicted.
Figure 20:
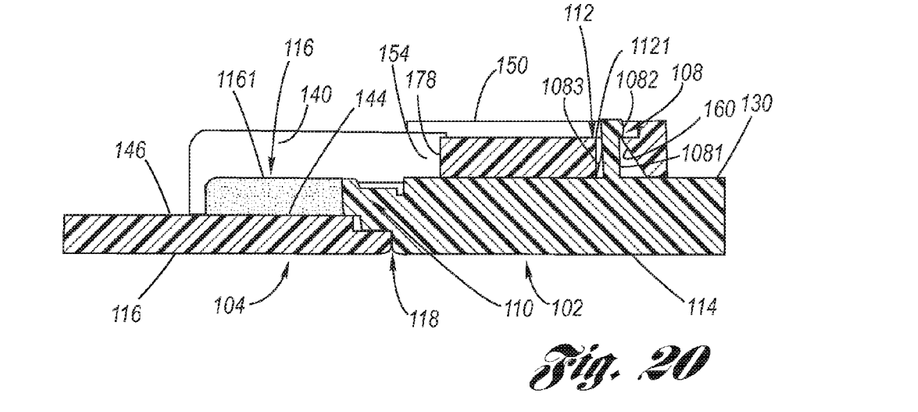
FIG. 20 is a sectional view, seen along line 20-20 of FIG. 19.
Figure 21:
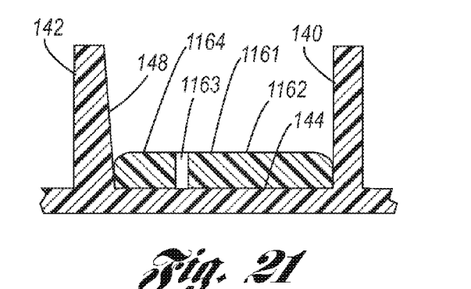
FIG. 21 is a sectional view seen along line 21-21 of FIG. 19.

Referring next to FIGS. 19 through 21, shown is the fully mated state of the first and second components 102, 104, and in particular the fully mated interface between the aforedescribed first and second male alignment features 106, 108 and the first and second female alignment features 110, 112. In this regard, the first elastic cantilever beam 1061 is seated in over-constrained relation with respect to the first and second alignment walls 140, 142, and wherein the second elastic cantilever beam 1081 is received in over-constrained and interfering relation to the cammed aperture 112, whereby the first component 102 is precisely and closely located relative to the second component 104, as will be detailed hereinbelow.

In the fully mated interface as shown at FIGS. 19 through 21, with the first elastic cantilever beam 1061 abutting the floor 144, the non-deformable beam arm 1062 abuts the first guide wall 140, the elastically deformable beam arm 1064 is over-constrained by the first wedge cam 148 of the second alignment wall 142 so as to be elastically bent into the slot 1063, and the first elastic cantilever beam 1161 is spaced from a blind end 178 of the rearward cutout 154. In the fully mated interface as further shown at FIGS. 19 and 20, the second elastic cantilever beam 1081 is received in the cammed aperture 1121, having an over-constrained elastic deformation with respect to the second wedge cam 160 and in an interfering relation of the beam boss 1082 with respect to the foot adjoining the cam sidewall 1122 (see FIG. 20), and the rib 1083 abuts a sidewall of the cammed aperture opposite the cam sidewall, whereby the up-down location of the first and second components is fixed.

Turning attention to FIGS. 22 through 26, an example of the mating process of the first and second components 102, 104 will be described.

Figure 22:
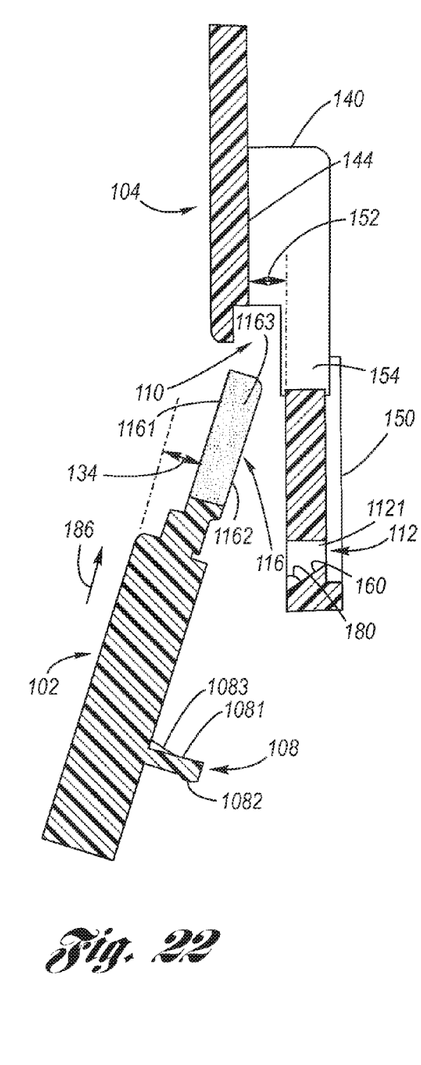
FIG. 22 is a sectional view as in FIG. 20, showing mating of the first and second components of FIG. 13 at an initial stage of the mating process.
Figure 23:
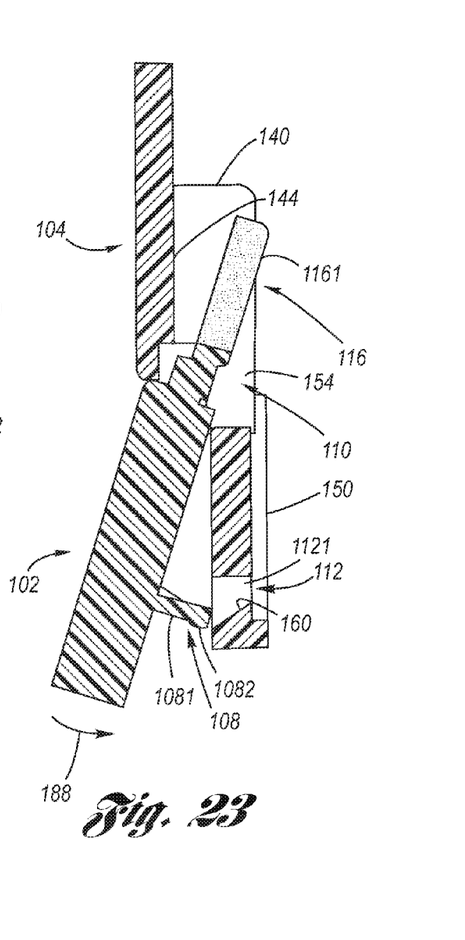
FIG. 23 is a sectional view as in FIG. 20, showing mating of the first and second components of FIG. 13 at a latter stage of the mating process.

As depicted at FIG. 22, the first component 102 is acutely angled with respect to the second component 104, which is assumed to be already attached to a structure (not shown), wherein the first male alignment feature 106 is inserted (see arrow 186) into the first female alignment feature 110. While not shown, the bosses discussed with respect to FIG. 9 may optionally be included to regulate over insertion.

Figure 24:
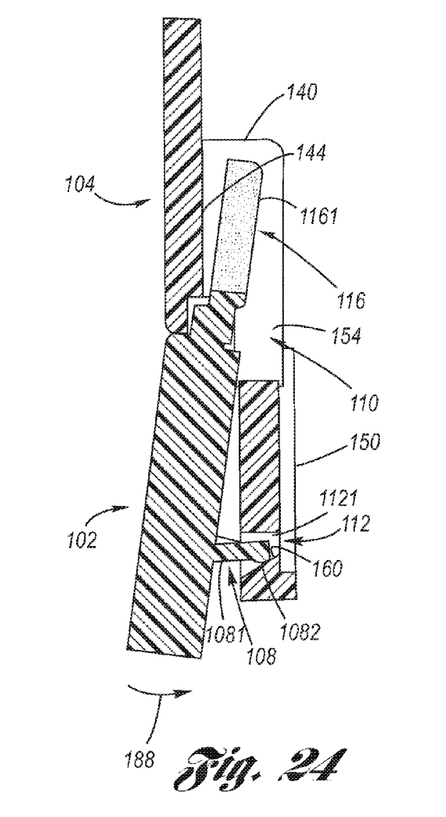
FIG. 24 is a sectional view as in FIG. 20, showing mating of the first and second components of FIG. 13 at a still latter stage of the mating process.
Figure 25:
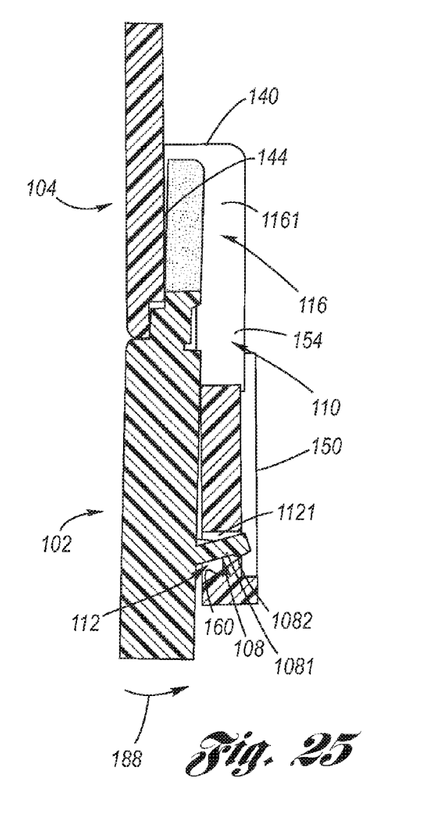
FIG. 25 is a sectional view as in FIG. 20, showing mating of the first and second components of FIG. 13 at a yet latter stage of the mating process.
Figure 26:
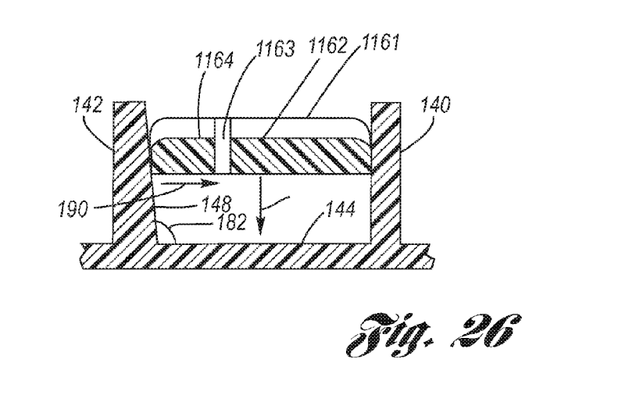
FIG. 26 is a sectional view as in FIG. 21, showing mating of the first and second components of FIG. 13 at a stage of the mating process generally similar to that shown at FIG. 24.

Thereafter, as progressively depicted by FIGS. 22 through 25, as well as by FIG. 26 (which is a view generally coincident with that of FIG. 24), the first component 102 is rotated (see arrows 188) relative to the second component 104 so that the second male alignment feature 108 is received by the second female alignment feature 112. As the first and second components 102, 104 are mated together during the rotation, the first elastic cantilever beam 1061 contacts the first and second alignment walls 140, 142 and becomes over-constrained in relation thereto by action the first cam wedge 148 in relation to the first alignment wall (see FIG. 26), wherein with further rotation (from FIG. 24 past FIG. 25 to the fully mated state shown at FIG. 20) the elastically deformable beam arm 1064 is elastically deformed by being progressively resiliently bent (along arrow 190) into the slot 1063, and this process concludes when the first elastic cantilever beam abuts the floor 144, as depicted at FIGS. 20 and 21. Simultaneously, the second elastic cantilever beam 1081 is received into the cammed aperture 1121, and in so doing is elastically deformed by being progressively resiliently bent by the beam boss 1082 thereof abuttingly sliding on the second wedge cam 160 of the cammed aperture 108 until the beam boss has passed through the cammed aperture, whereupon the second elastic cantilever beam snaps resiliently into a less bent, yet still over-constrained state, in which the beam boss now interferingly rests upon the foot 150 adjoining the cam sidewall 1122 with the second elastic cantilever beam being resiliently pressed against the cam sidewall, and resiliently held so by the rib 1083 in relation to the sidewall of the cammed aperture.

It is to be understood from the foregoing description that as the first component is rotated relative to the second component, the first wedge cam of the second alignment wall in cooperation with the first alignment wall causes resilient bending of the elastically deformable beam arm. The resulting over-constrained state therebetween eliminates the cross-car movement of, and precisely locates, the first and second components. Simultaneously, the beam boss acting against the second wedge cam of the cam sidewall causes the second elastic cantilever beam to be resiliently deformed, which over-constrained relationship therebetween pulls the first and second components together so as to eliminate up-down spacing between the first and second components at the joinder therebetween. Additionally the over-constrained relationships present when the first and second components are at the fully mated state thereof, eliminate rattle and provide stiffened positional constraint between the first and second components.

Figures 27, 28, 29:
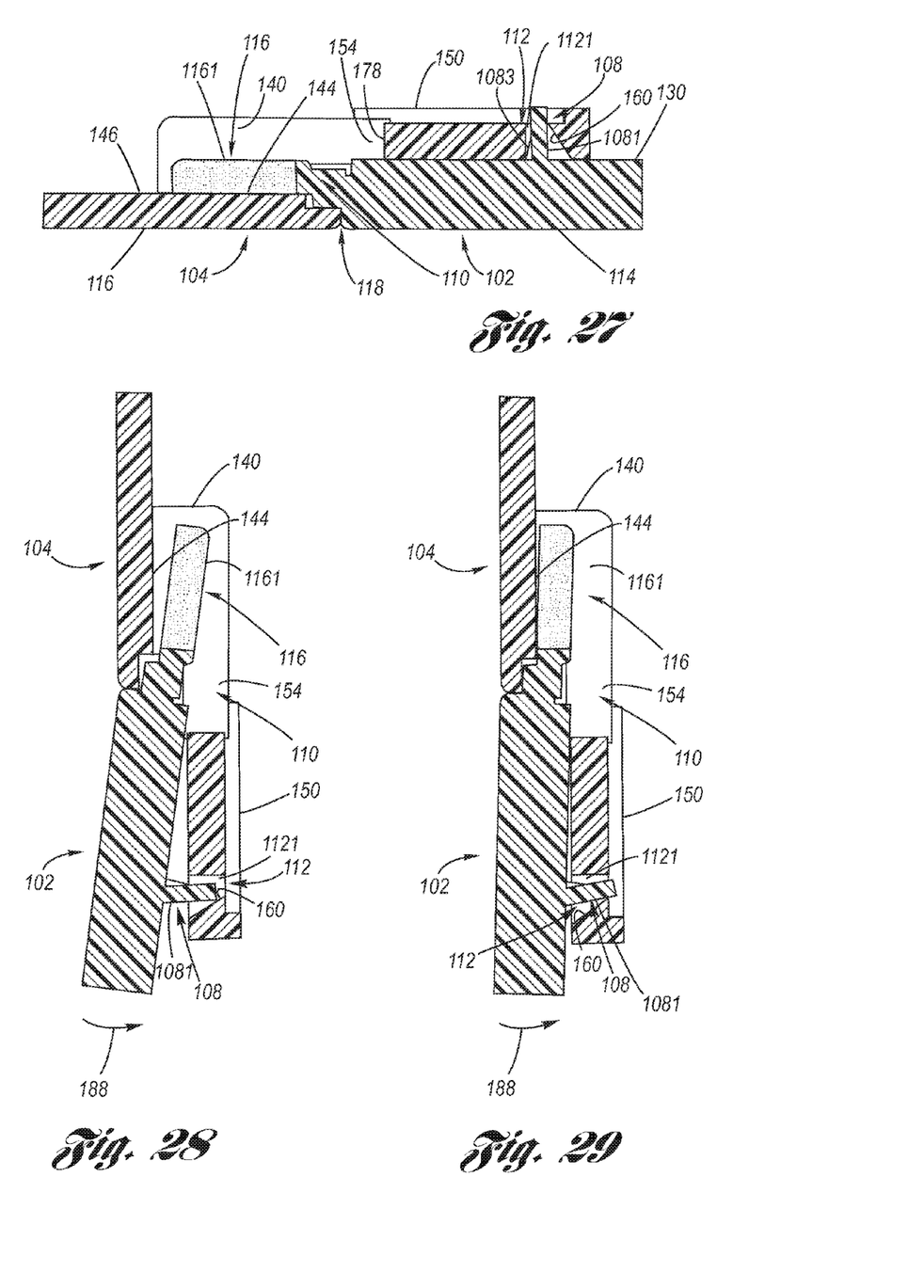
FIG. 27 is a sectional view as in FIG. 20, wherein now the beam boss is not present.
FIG. 28 is a sectional view as in FIG. 24, wherein now the beam boss is not present.
FIG. 29 is a sectional view as in FIG. 25, wherein now the beam boss is not present.

With reference now to FIGS. 27 through 29, the aforedescribed mating relationships with respect to the first and second components 102, 104, as per FIGS. 20, 24 and 25 are as described hereinabove with the exception that now the beam boss is not provided. In this regard, the second elastic cantilever beam 1081 is received into the cammed aperture 1121, and in so doing is elastically deformed by being progressively resiliently bent by abuttingly sliding on the second wedge cam 160 of the cammed aperture 108, whereupon in the fully mated state the second elastic cantilever beam is in over-constrained state with respect to the cam sidewall 1122 (resiliently pressed thereagainst), and resiliently held so by the rib 1083 in relation to the sidewall of the cammed aperture. It is to be understood that the second elastic cantilever beam acts against the second wedge cam of the cam sidewall so as to cause it to be resiliently deformed, which over-constrained relationship therebetween pulls the first and second components together so as to eliminate up-down spacing between the first and second components at the joinder therebetween.

In accordance with the present invention, elastic deformation by the first elastic cantilever beam and the second elastic cantilever beam provide an elastic averaged fit between the first and second components, being averaged over manufacturing variance of the male alignment features with respect to the female alignment features.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. An elastic cantilever beam alignment system for aligning and pulling together a pair of components relative to each other, said system comprising:
    a first component having a first component first side, an oppositely disposed first component second side, and a forward end;
    a second component having a second component first side, an oppositely disposed second component second side, and a foot connected to said second component first side;
    a first male alignment feature comprising a first elastic cantilever beam connected to said forward end in substantially parallel relation to said first component first side;
    a second male alignment feature connected to said first component first side in substantially perpendicular relation thereto;
    a first female alignment feature comprising:
        a first alignment wall connected to said first side of said second component;
        a second alignment wall connected to said first side of said second component in spaced relation with respect to said first alignment wall, said second alignment wall having a first wedge cam in facing relation to said first alignment wall; and
        a floor disposed at said second component first side between said first and second alignment walls;
    a second female alignment feature formed in said foot;
    a substantially non-deformable arm disposed on one side of a slot formed in said first elastic cantilever beam; and
    an elastically deformable arm disposed on an opposite side of the slot from the one side of the slot;
    wherein the elastically over-constrained relation of said first male alignment feature with respect to said first and second alignment walls comprises said elastically deformable arm being elastically bent into the slot due to said first wedge cam over constraining said first male alignment feature in relation to said first alignment wall;
    wherein in a fully mated state of said first and second components, said first male alignment feature is elastically aligned with respect to said first female alignment feature by said first elastic cantilever beam abutting said floor and being in an elastically over-constrained relation with respect to said first and second alignment walls, and said second male alignment feature is elastically aligned with respect to said second female alignment feature.

2. An elastic cantilever beam alignment system for aligning and pulling together a pair of components relative to each other, said system comprising:
    a first component having a first component first side, an oppositely disposed first component second side, and a forward end;
    a second component having a second component first side, an oppositely disposed second component second side, and a foot connected to said second component first side;
    a first male alignment feature comprising a first elastic cantilever beam connected to said forward end in substantially parallel relation to said first component first side;
    a second male alignment feature comprising a second elastic cantilever beam connected to said first component first side in substantially perpendicular relation thereto;
    a first female alignment feature comprising:
        a first alignment wall connected to said first side of said second component;
        a second alignment wall connected to said first side of said second component in spaced relation with respect to said first alignment wall, said second alignment wall having a first wedge cam in facing relation to said first alignment wall; and
        a floor disposed at said second component first side between said first and second alignment walls;
        wherein said foot is connected to said first and second alignment walls in spaced relation with respect to said second component first side;
    a second female alignment feature comprising a cammed aperture formed in said foot having a second wedge cam formed at a cam sidewall thereof;
    a substantially non-deformable arm disposed on one side of a slot formed in said first elastic cantilever beam; and
    an elastically deformable arm disposed on the other side of the slot;
    wherein the elastically over-constrained relation of said first male alignment feature with respect to said first and second alignment walls comprises said elastically deformable arm being elastically bent into the slot as said first elastic cantilever beam is abutted to said floor;
    wherein in a fully mated state of said first and second components, said first male alignment feature is elastically aligned with respect to said first female alignment feature by said first elastic cantilever beam abutting said floor in an elastically over-constrained relation with respect to said first wedge cam of said second alignment wall and said first alignment wall, and said second male alignment feature is elastically aligned with respect to said second female alignment feature by elastic bending of said second elastic cantilever beam by abutment with said second wedge cam at the cam sidewall of said cammed aperture.

3. The alignment system of claim 2, wherein said second male alignment feature comprises said second elastic cantilever beam having a convex beam boss disposed at a distal end thereof; wherein said first and second components are mutually aligned during mating thereof by said second male alignment feature being received by said second female alignment feature, wherein during the mating, said second elastic cantilever beam is resiliently flexed by abutment of said beam boss with respect to said second wedge cam; and wherein in the fully mated state of said first and second components, said second elastic cantilever beam is resiliently flexed by abutment with respect to said second wedge cam and said beam boss interferingly abuts said foot in adjoining relation to said cam sidewall.

4. The alignment system of claim 2, further comprising a rib disposed at a base of said second elastic cantilever beam, wherein in the fully mated state of said first and second components, said rib abuts said cammed aperture opposite said cam sidewall.

5. The alignment system of claim 4, wherein when said first component is mated to said second component a joinder is formed therebetween at a first edge of said first component second side and at a second edge of said second component second side; and wherein an interface of first male alignment feature with said first female alignment feature and said interface of said second male alignment feature with said second female alignment feature provides precise alignment of said first and second edges to each other and pulls said first and second edges mutually together.

6. The alignment system of claim 5, wherein said second male alignment feature comprises said second elastic cantilever beam having a convex beam boss disposed at a distal end thereof; wherein said first and second components are mutually aligned during mating thereof by said second male alignment feature being received by said second female alignment feature, wherein during the mating, said second elastic cantilever beam is resiliently flexed by abutment of said beam boss with respect to said second wedge cam; and wherein in the fully mated state of said first and second components, said second elastic cantilever beam is resiliently flexed by abutment with respect to said second wedge cam and said beam boss interferingly abuts said foot in adjoining relation to said cam sidewall.

7. The alignment system of claim 6, wherein said first elastic cantilever beam projects from said forward edge along a protrusion axis, wherein said first and second male alignment features are mutually separated a predetermined separation distance along said protrusion axis, and wherein said second elastic cantilever beam is elongated in a direction perpendicular to said protrusion axis.

8. The alignment system of claim 7, wherein said first female alignment feature further comprises a rearward cutout formed in said foot, said rearward cutout adjoining said first and second alignment walls.

* * * * *